A. G. BOWEN.
UNIVERSAL JOINT.
APPLICATION FILED OCT. 30, 1909.
1,145,401. Patented July 6, 1915.
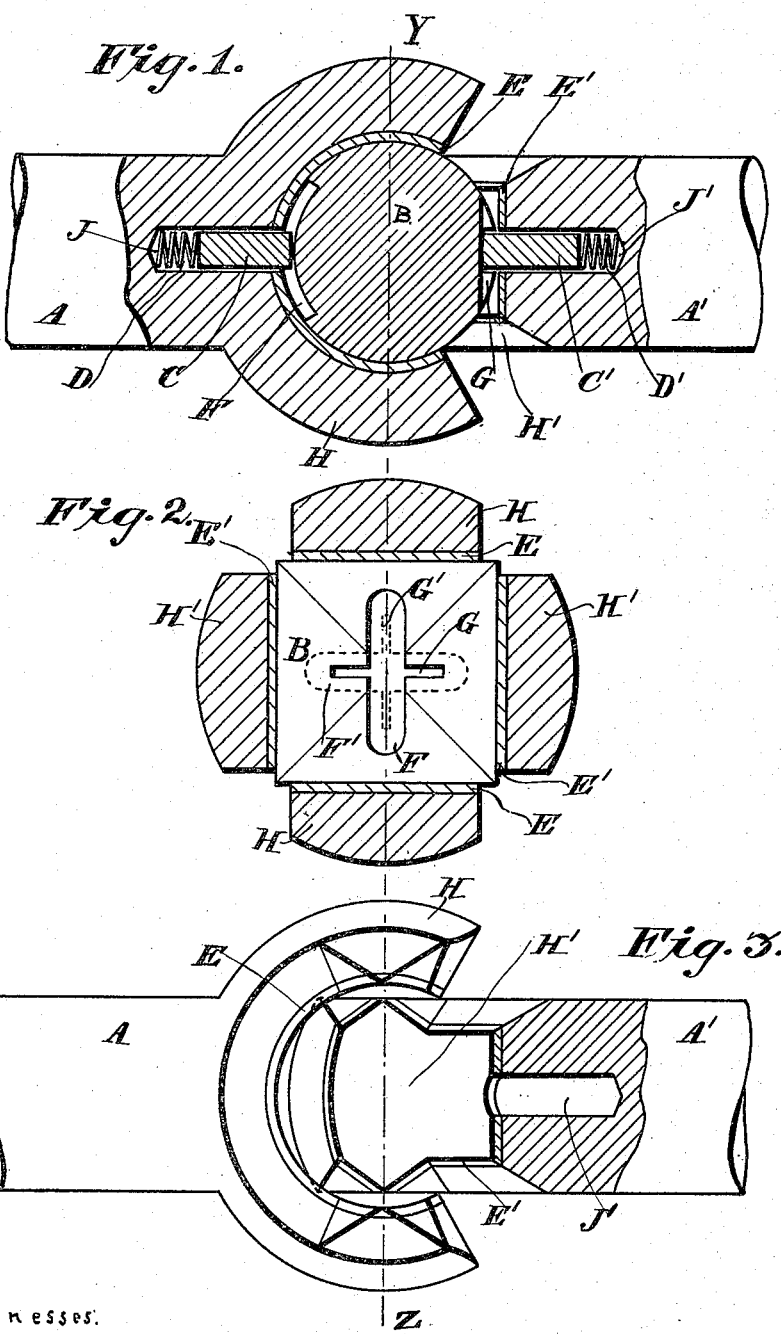

UNITED STATES PATENT OFFICE.

ADNA G. BOWEN, OF MEDINA, NEW YORK.

UNIVERSAL JOINT.

1,145,401.  Specification of Letters Patent.  Patented July 6, 1915.

Application filed October 30, 1909. Serial No. 525,584.

*To all whom it may concern:*

Be it known that I, ADNA G. BOWEN, a citizen of the United States, residing in the village of Medina, in the county of Orleans and State of New York, have invented a certain new and useful Improvement in Universal Joints; and I do hereby declare the following to be a full, clear, and exact description of the invention, such as will enable others skilled in the art to which it appertains to make and use the same.

My invention relates to universal joints, and has for its object the production of a strong, simple and reliable universal joint adapted to withstand severe strain and afford the greatest capacity and strength.

The object of my invention is accomplished by the construction and arrangement illustrated in the accompanying drawings, in which—

Figure 1. is a partial axial section and partial elevation of the universal joint. Fig. 2. is a central transverse section of the jaws of the shaft members of the universal joint on the line Y—Z, and a plan view of the block interposed between the same. Fig. 3. is a plan view of the shaft members of the universal joint with the block removed and one of the jaws cut away, showing the relative position of the jaws when the shaft members are in alinement.

In the several views similar letters refer to similar parts.

It will be seen that the essential elements of this improved universal joint are, the two shaft members, the block interposed between the adjacent jaws of said members, and the means employed to keep said jaws centered on said block against lateral movement.

A and A' are the shaft members, either one of which may be the driving member.

B is the block interposed between the jaws of the said shaft members. It has two cylindrical faces.

C and C' are pins fitting in holes centrally located in the shaft members A—A' and projecting into grooves in the block B, for the purpose of locking the same in rotating engagement and against lateral movement.

D and D' are spiral springs.

E and E' are removable and renewable wearing surfaces within the jaws of the shaft members.

F and F' are grooves in the block B, into which the pins C and C' respectively project, for the purpose of holding the said block and shaft members together in operative relation.

G and G' are narrow channels or cuts crossing the grooves F—F' respectively, the purpose of which is to permit the introduction of any narrow wedge-shaped tool to lift the pins C—C', thereby unlocking the shaft members.

H and H' are the jaws of the shaft members A—A' respectively, embracing the block B for more than one half of its circumference, and in this particular case for 240 degrees thereof.

J and J' are the central longitudinal holes in the shaft members A—A' into which the springs D—D' and the pins C—C' are inserted.

It will thus be seen that this is a self-contained universal joint with no parts liable to become loose or lost while running, and in which the wearing parts are readily renewable.

To assemble the joint the block B is introduced between the jaws of one of the shaft members, forcing the pin back against the spring until the block is in such position that the pin drops into the groove in the block, locking the same in position. The other shaft member is then brought into position so that the jaws may be slipped over the block, in doing which the pin of this member is likewise forced back until it drops into its groove, locking this member in position. The joint is now ready for use.

To dis-assemble the joint it is only necessary to introduce a narrow wedge-shaped tool in the channels or cuts G G' so as to force back the pins free from the grooves in the block B. When this is done the shaft members will slip off of the block, the block may be taken out, the pins removed, and the removable wearing surfaces taken out.

The pins, on account of their location, are subjected to very little wear or strain, and lock the wearing surfaces E—E' as well as the other parts.

I claim as my invention—

1. A universal joint, consisting of two shaft members having jaws embracing more than one half of the circumference of a cylindrical block, a block having two cylindrical faces interposed between said jaws at the adjacent ends of said shaft members, and pins within said shaft members for locking the several parts in rotating engagement.

2. A universal joint, consisting of two shaft members having jaws embracing more than one half of the circumference of a cylindrical block, a block having two cylindrical faces interposed between said jaws at the adjacent ends of said members, and pins within said shaft members for locking the jaws thereof on said block against lateral movement.

3. A universal joint, consisting of two shaft members having jaws embracing more than one half of the circumference of a cylindrical block and freely movable laterally thereon, a block having two cylindrical faces interposed between the adjacent jaws of the shaft members, and pins within said shaft members for locking the several parts in rotating engagement.

4. A universal joint consisting of two shaft members having jaws embracing more than one half of the circumference of a cylindrical block and freely movable laterally thereon, a block having two cylindrical faces interposed between the adjacent jaws of the shaft members, and pins within said shaft members for locking the jaws thereof on said block against lateral movement.

5. A universal joint, consisting of two shaft members having jaws embracing more than one half of the circumference of a cylindrical block, a block having two cylindrical faces interposed between the adjacent jaws of the shaft members, and pins lying within central longitudinal holes in said shaft members and projecting into grooves in said block for the purpose of locking the several parts in rotating engagement.

6. A universal joint, consisting of two shaft members having jaws embracing more than one half of the circumference of a cylindrical block, a block having two cylindrical faces interposed between the adjacent jaws of the shaft members, and pins lying within central longitudinal holes in said shaft members and projecting into grooves in said block for the purpose of locking the jaws of the shaft members on said block against lateral movement.

7. A universal joint, consisting of two shaft members having jaws embracing more than one half of the circumference of a cylindrical block, a block having two cylindrical faces interposed between the adjacent jaws of the shaft members, longitudinally movable pins lying within central longitudinal holes in said shaft members and projecting into grooves in said block for the purpose of locking the several parts in rotating engagement, and springs for holding the pins projected.

8. A universal joint, consisting of two shaft members having jaws embracing more than one half of the circumference of a cylindrical block, a block having two cylindrical faces interposed between the adjacent jaws of the shaft members, longitudinally movable pins lying within central longitudinal holes in said shaft members and projecting into grooves in said block for the purpose of locking the jaws of the shaft members on said block against lateral movement, and springs for holding the pins projected.

9. A universal joint consisting of two shaft members having jaws embracing more than one half of the circumference of a cylindrical block, a block having two cylindrical faces interposed between the adjacent jaws of the shaft members, removable wearing surfaces between said jaws and said block, pins lying within central longitudinal holes in said shaft members and projecting through said removable wearing surfaces into grooves in said block for the purpose of locking the several parts in position, and springs for holding the pins projected.

ADNA G. BOWEN.

Witnesses:
HELEN C. BOWEN,
ABIEL BOWEN.

Copies of this patent may be obtained for five cents each, by addressing the "Commissioner of Patents, Washington, D. C."